United States Patent Office 3,672,961
Patented June 27, 1972

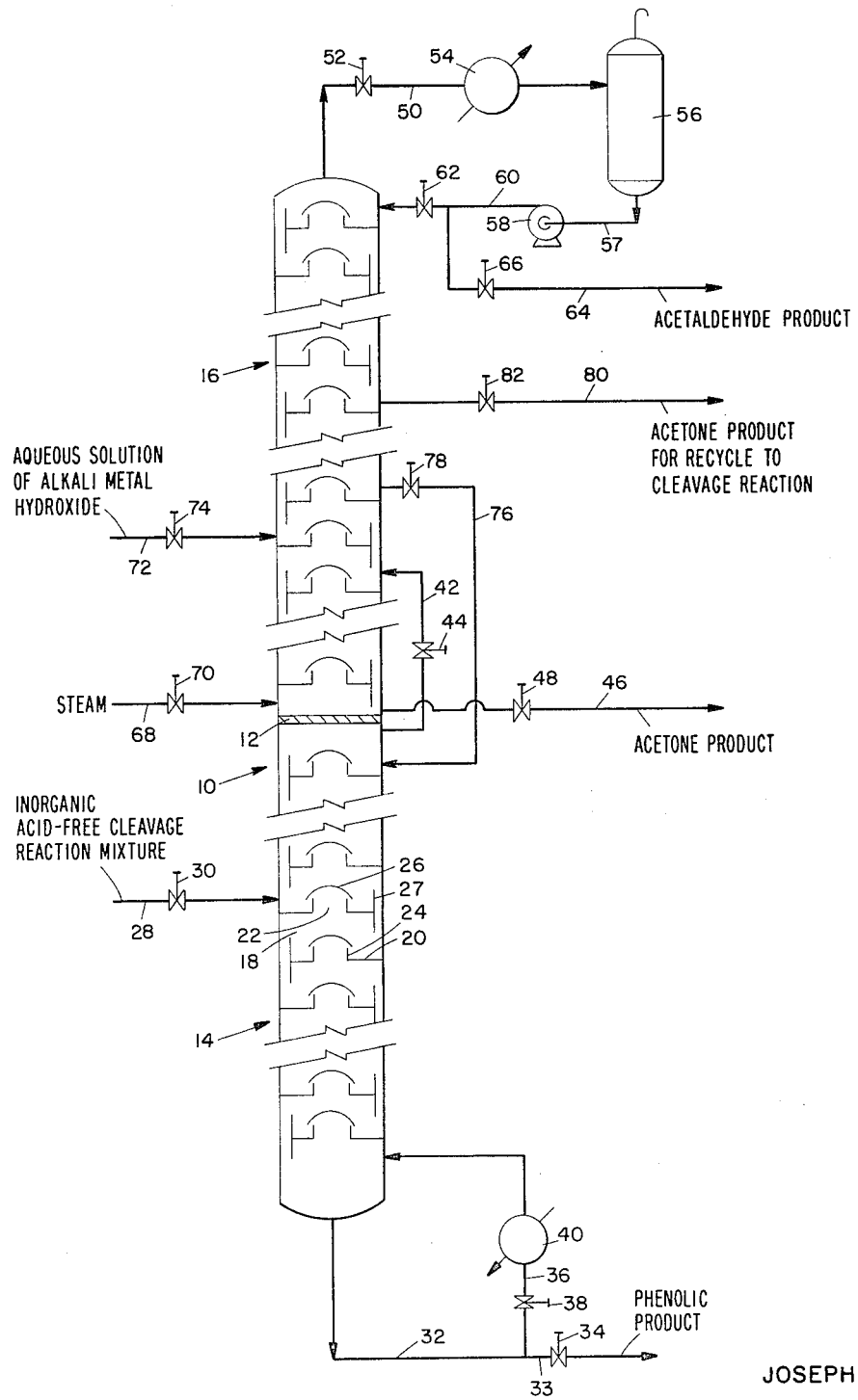

3,672,961
FRACTIONATION OF INORGANIC ACID-FREE, CLEAVAGE REACTION MIXTURE
Joseph R. Nixon, Jr., Wilmington, Del., assignor to Hercules Incorporated, Wilmington, Del.
Filed Oct. 16, 1969, Ser. No. 867,011
Int. Cl. B01d 3/34
U.S. Cl. 203—37
6 Claims

ABSTRACT OF THE DISCLOSURE

Disclosed is a continuous process for fractionating in a single, multiple plate distillation column an inorganic acid-mixture resulting from the cleavage reaction of hydroperoxide material selected from the group consisting of cumene hydroperoxide, cymene hydroperoxides, $\beta$-isopropylnaphthalene hydroperoxide, m- and p-diisopropylbenzene mono- and dihydroperoxides. The column has a lower fractional distillation zone and an upper fractional condensation zone. In the process the mixture is introduced into the lower zone and separated therein by fractional distillation into a liquid phenolic product and a vaporous acetaldehyde-acetone fraction. The vaporous fraction is introduced into the upper zone and separated by condensation into a liquid acetone fraction and a vaporous acetaldehyde fraction. The liquid acetone fraction is withdrawn from the bottom of the upper zone as acetone product, while the vaporous acetaldehyde fraction is withdrawn from the top of the upper zone and condensed. A portion of the condensed acetaldehyde fraction is returned to the upper zone as reflux. A portion of the liquid at any stage of the upper zone is withdrawn and returned to the lower zone as reflux. However, in a preferred embodiment of the process, an aqueous solution of alkali metal hydroxide material, at a rate sufficient to establish and maintain alkaline the liquid contents of the feed stage and any lower stages of the upper zone, as well as the acetone product, is introduced into the upper zone at the feed stage or preferably at a stage above the feed stage at which the liquid water content is high enough to maintain the alkali metal hydroxide material in solution. In such embodiment the lower zone reflux liquid is withdrawn from the upper zone at a stage above the stage at which the aqueous alkali metal hydroxide solution is introduced.

This invention is in the chemical arts. It relates to the hydroperoxide process for the production of a phenol and acetone.

In the hydroperoxide process for the production of a phenolic product and acetone from hydroperoxide material selected from the group consisting of cumene hydroperoxide, o-, m-, and p-cymene hydroperoxides, $\beta$-isopropylnaphthalene hydroperoxide, and m- and p-diisopropylbenzene mono- and dihydroperoxides, the hydroperoxide material undergoes a cleavage reaction and neutralizaton procedure whereby there is obtained a complex, liquid, inorganic acid-free, reaction mixture comprising acetone and for each hydroperoxide in the hydroperoxide material a phenol corresponding to the aryl moiety of the hydroperoxide, which phenol is selected from the group consisting of phenol, o-cresol, m-cresol, p-cresol, $\beta$-naphthol, m-isopropyl phenol, p-isopropyl phenol, resorcinol and hydroquinone. The mixture is then treated to obtain an acetone product and a phenolic product of desired purities.

Heretofore, in one process for separating the mixture into acetone and phenolic products of desired purities, the mixture is fractionated by fractional distillation in a multiple plate distillation column or tower into a liquid crude phenolic fraction and a vaporous crude acetone fraction. The vaporous acetone fraction is condensed and the condensate is introduced into another multiple plate distillation column and separated therein by fractional distillation into a vaporous acetaldehyde fraction and a liquid acetone fraction. The liquid acetone fraction is introduced into still another multiple plate distillation column and fractionated into a vaporous acetone fraction of desired purity, which is condensed, and a liquid impurities fraction.

This invention provides a continuous proces for separating the mixture into a crude phenolic fraction, a liquid acetone fraction, and an acetaldehyde fraction in a single multiple plate distillation column.

In summary, this invention involves a single multiple plate distillation column horizontally divided by partition means into a lower fractional distillation zone and an upper condensation zone. In the continuous process of this invention the inorganic acid-free, cleavage reaction mixture is introduced into the lower zone preferably at an intermediate stage thereof. When introduced into the lower zone the mixture can be all liquid, partially vaporized or totally vaporized. The mixture is fractionated in the lower zone by fractional distillation into a liquid phenolic product preferably substantially free of acetone, and a vaporous acetaldehyde-acetone fraction preferably substantially free of phenolic material. The vaporous acetaldehyde-acetone fraction is withdrawn from the lower zone and, without condensing it, introduced into the upper zone preferably at an intermediate stage thereof. In the upper zone, the vaporous acetaldehyde-acetone fraction is fractionally condensed to give a liquid acetone product preferably substantially free of acetaldehyde and of phenolic material, and a vaporous acetaldehyde product. The acetone product is withdrawn from the bottom of the upper zone, while the vaporous acetaldehyde fraction is withdrawn from the top of the upper zone and condensed with at least part of the condensate being returned to preferably the upper part of the upper zone as reflux. A portion of the liquid at any stage of the upper zone is withdrawn and introduced as reflux preferably into the upper portion of the lower zone.

In a preferred embodiment of this process an aqueous solution of alkali metal hydroxide material, at a rate sufficient to establish and maintain alkaline the liquid contents of the feed stage and any lower stages of the upper zone, as well as the acetone product, is introduced into the upper zone at a stage selected from the feed stage and "wet" stages above the feed stage. A "wet" stage above the feed stage is a stage in which the liquid water content is sufficiently high that the total water content after addition of the aqueous solution of alkali metal hydroxide material is enough to maintain the alkali metal hydroxide material in solution in the presence of liquid acetone. Also, alkali metal hydroxide material is material that consists essentially of an alkali metal hydroxide, examples of which include sodium hydroxide, potassium hydroxide, and the like. In some embodiments of this invention the alkali metal hydroxide material comprises only one alkali metal hydroxide. In other embodiments it comprises two or more alkali metal hydroxides. In general the minimum water concentration needed to maintain the alkali metal hydroxide material in solution under the conditions of this invention is about 5% by weight of the liquid acetone present. A preferred aqueous solution of alkali metal hydroxide material is one in which the concentration of the alkali metal hydroxide material is about 1–25% by weight of the solution. However, higher and lower concentrations are within the broader concepts of this invention.

In this preferred embodiment of the process of this invention liquid that is withdrawn from the upper zone and returned as reflux to the lower zone is preferably withdrawn from a stage above the stage at which the aqueous alkali hydroxide material solution is introduced.

The best mode now contemplated of carrying out this invention is illustrated by the drawing which forms a material part of these disclosures, and which shows a simplified flow sheet for carrying out a preferred specific embodnment of the process of this invention.

More particularly, the drawing displays a flow sheet in which pertinent sections of a single, multiple plate distillation tower or column 10 are diagrammatically shown. The column 10, formed by a cylindrical casing, is divided internally by a horizontal partition 12 into a lower fractional distillation zone 14 and an upper condensation zone 16. Each zone is subdivided horizontally into superposed stages or compartments 18 by horizontally disposed vertically spaced plates or trays 20. In the embodiment of the column 10 shown in the drawing, each tray 20 is provided with at least one opening 22 in combination with an upriser 24 and a bubble cap 26 for delivering vapor from below the tray into the compartment and bubbling it into the liquid that collects on the tray. Generally each tray 20 has a plurality of such openings uniformly spaced with uprisers 24 and bubble caps 26. Each tray 20 is provided with at least one downcomer 27 which establishes in the compartment a normal liquid overflow level, and which delivers liquid overflow from each compartment to the subjacent compartment. The normal liquid overflow level of each compartment is sufficiently above the level at which vapor emerges from under the bubble cap or caps 26 into the compartment to give the desired vapor-liquid contact, but sufficiently below the top of the compartment to minimize liquid entrainment by vapor ascending through each upriser 24 into the superjacent compartment.

In another embodiment of the column 10 each tray 20 is a sieve plate which is perforated sufficiently to permit passage therethrough of vapor from the compartment below. In this embodiment each tray 20 is provided with at least one downcomer 27 for the same purpose as described above.

In still another embodiment of the column 10 each tray 20 is a sinuous or ripple-like sieve plate which is perforated sufficiently to permit the downflow of liquid that collects on the plate, and the upflow of vapor from the compartment below.

According to the embodiment of this invention depicted by the drawing, liquid, inorganic acid-free, cleavage reaction mixture is continuously introduced into an intermediate compartment of the lower, fractional distillation zone 14 by way of a feed conduit 28 provided with a flow control valve 30.

Liquid reaching the bottom of the lower zone 14 is withdrawn from the column 10 by a crude phenolic fraction discharge conduit 32. A portion of the liquid withdrawn via the crude phenolic fraction discharge conduit 32 is conveyed by way of a recycle conduit 36 which has a flow control valve 38 and which is joined to the discharge conduit 32, through a heat exchanger 40 wherein it is heated and enough of it vaporized to establish and maintain the desired heat conditions in each of the compartments of the lower zone 14, and then introduced into the bottom region, preferably into the bottom collection compartment, of the lower zone 14. The remainder of the crude phenolic fraction withdrawn through the crude phenolic fraction discharge conduit 32 is conveyed away through a phenolic product conduit 33 with a flow control valve 34 as the phenolic product of the process of this invention. Generally, this product has to be treated further, for example by fractional distillation, to obtain a phenolic product of high purity.

Vapor that collects in the top compartment of the lower zone 14 is withdrawn therefrom by way of vapor discharge conduit 42 which has a flow control valve 44, and is introduced thereby into an intermediate compartment of the upper, fractional condensation zone 16. Heat conditions established and maintained in the compartments of the upper zone 16 are such that as vapor rises through the compartments of the upper zone 16, condensation of acetone takes place without substantial condensation of acetaldehyde, and liquid acetone that collects in each compartment overflows through the downcomer 27 and ultimately collects in the bottom compartment of the upper zone 16.

The liquid that collects in the bottom compartment of the upper zone 16 is withdrawn by way of acetone product discharge conduit 46 which has a flow control valve 48. This liquid is the acetone product of the process of this invention. It is substantially free of acetaldehyde. However, it usually must be further treated to obtain an acetone product of high purity.

Vapor that collects in the top compartment of the upper zone 16 is withdrawn by acetaldehyde fraction discharge conduit 50 which has a flow control valve 52, and is conveyed thereby through a condenser 54, wherein it is condensed, and into a storage tank 56. Liquid acetaldehyde fraction is removed from the tank 56 by a conduit 57 to the suction side of a pump 58. The pump outlet is connected to an acetaldehyde fraction return conduit 60 with a flow control valve 62, whereby at least part of the liquid acetaldehyde fraction is introduced as reflux into the top part of the upper distillation zone 16. A product discharge conduit 64 with a flow control valve 66 is joined to the liquid acetaldehyde fraction return conduit 60 for removal from the system of acetaldehyde fraction condensate as a product of the process.

This acetaldehyde product can be sent to waste or, if desired, treated to recover at least part of its acetone content or to obtain an acetaldehyde product of high purity.

To establish and maintain the desired heat conditions in the upper, condensation zone 16, it is usually necessary to supply heat to the upper zone. In one embodiment of this invention this is accomplished by returning a portion of the acetone product from conduit 46 through a heat exchanger wherein sufficient heat is added to the liquid to vaporize at least part of it at least when it reaches the upper zone 16, and into the bottom collection compartment of the upper zone 16, whereby vaporous acetone rises through the compartments and imparts sufficient heat to the liquid contents of the compartments to strip residual acetaldehyde from them. In the embodiment illustrated in the drawing, however, heat is supplied to the upper zone 16 by introducing steam by way of a steam supply conduit 68 with a flow control valve 70 to the bottom region, preferably the bottom compartment, of the upper zone 16. The quantity of steam and the steam pressure are selected so that there is substantially no acetaldehyde in the acetone product removed by way of acetone product discharge conduit 46 from the bottom or collecton compartment of the upper zone 16, and so that the quantity of acetone in the acetaldehyde product withdrawn from the process by way of acetaldehyde product discharge conduit 64 is at a minimum.

A 25% by weight aqueous solution of caustic is introduced by way of an aqueous caustic solution feed conduit 72 with a flow control valve 74 into the condensation zone 16 at a "wet" intermediate stage above the feed stage of the zone. The rate of introduction is controlled by the flow control valve 74 so that the pH of the acetone product withdrawn from the upper zone 16 through the acetone product discharge conduit 46 is established and maintained at about 8–8.5. As a result, any trace quantity of carboxylic acid material that enters the upper zone 16 in the acetaldehyde-acetone fraction is neutralized and any trace amount of sulfur-containing material that adversely affects the quality of the ultimate acetone product is rendered innocuous.

A portion of the liquid in the upper zone 16 is returned to the upper portion of the lower zone 16 as reflux. This is done in the illustrated embodiment by withdrawing through a reflux conduit 76 with a flow control valve 78 liquid from an upper zone intermediate compartment above the compartment into which the caustic solution is introduced, and the liquid thus withdrawn is introduced by way of the reflux conduit 76 into the top compartment of the lower zone 14. The flow rate of reflux liquid is established and maintained by regulation of the flow control valve 78 so that the flow rate ratio of reflux liquid to acetaldehyde-acetone fraction passing through the lower zone vapor discharge conduit 42 is in a range from about 0.5:1 to about 0.7:1 on a weight basis. However, operable higher and lower to flow rate ratios are within the broader concepts of this invention.

In the upper region compartments of the condensation zone 16 the liquid content of each compartment, which is predominately acetone, has a water concentration low enough so that the liquid can be used in one known cleavage reaction process in which added acetone is employed. Consequently, in the embodiment illustrated in the drawing there is provided a recycle acetone product conduit 80 with a flow control valve 82 for withdrawing a portion of the liquid content of an upper region compartment below the top or overhead compartment of the condensation zone 16. Preferably, when recycle acetone is to be withdrawn, the condensation zone 16 has a sufficiently larger number of stages to obtain the desired extent of acetone condensation and the desired degree of acetaldehyde stripping from the liquid acetone.

A typical column 10 for fractionating according to the process of this invention a typical, inorganic acid-free, cumene hydroperoxide cleavage reaction mixture produced by the vacuum cleavage process (the cleavage reaction is not carried out in recycled acetone), which column, therefore, is operated without withdrawal of acetone product for recycle to the cleavage reaction (the withdrawal conduit 80 either is not present or is shut off by flow control valve 82), has twenty-four trays in lower zone 14 and twenty-six trays in the upper zone 16, the partition 12 not being counted as a tray. The cleavage reaction mixture feed conduit 28 is located so as to introduce the mixture into the lower zone compartment bottomed by the twentieth tray below the top of the lower zone 14 (the fifth tray above the bottom of the collection compartment of the lower zone). The acetaldehyde-acetone fraction conduit 42 is located so as to introduce the vaporous acetaldehyde-acetone fraction into the upper zone compartment bottomed by the thirteenth tray from the top of the upper zone 16 (the fourteenth tray from the partition 12) which forms the bottom of the collection compartment of the lower zone. The aqueous caustic solution feed conduit 72 is disposed so as to introduce the 25% by weight aqueous caustic solution into the upper zone compartment bottomed by the eleventh tray from the top (sixteenth from the partition 12). The reflux liquid conduit 76 is disposed so as to withdraw liquid from the upper zone compartment bottomed by the ninth tray from the top (eighteenth tray from the partition 12), and introduce it into the lower zone top compartment. Temperature of the liquid content of the bottom or collection compartment of the lower zone 14 is established and maintained at about 113° C. Temperature of the liquid content of the top compartment of the lower zone 14 is established and maintained at about 72° C. Temperature of the liquid content of the bottom collection compartment of the upper zone 16 is established and maintained at about 62° C., while temperature of the liquid content of the top compartment of the upper zone 16 is established and maintained at about 40° C. Typical normal steady state flow rates in pounds per hour are set forth in the following Table I.

TABLE I

|  | Conduits or streams | | | | | | | |
| --- | --- | --- | --- | --- | --- | --- | --- | --- |
|  | 28 | 33 | 42 | 68 | 72 | 46 | 64 | 76 |
| Acetaldehyde | 2 |  | 2 |  |  |  | 2 |  |
| Acetone | 2,450 |  | 9,400 |  |  | 2,426 | 24 | 6,950 |
| Water | 830 | 49 | 1,148 | 960 | 12 | 1,751 | 2 | 367 |
| Mesityl oxide | 100 |  | 100 |  |  | 100 |  |  |
| Cumene | 1,270 | 11 | 1,259 |  |  | 1,259 |  |  |
| α-Methyl styrene | 373 | 63 | 310 |  |  | 310 |  |  |
| Phenol | 4,400 | 4,394 | 6 |  |  | 6 |  |  |
| Acetophenone | 74 | 74 |  |  |  |  |  |  |
| α,α-Dimethylbenzyl alcohol | 26 | 26 |  |  |  |  |  |  |
| Cumyl phenol | 226 | 226 |  |  |  |  |  |  |
| Heavy ends | 249 | 249 |  |  |  |  |  |  |
| Sodium hydroxide |  |  |  |  | 4 | 4 |  |  |
| Total | 10,000 | 5,092 | 12,225 | 960 | 16 | 5,856 | 28 | 7,317 |

These flow rates are established and maintained, for example, by means of the various flow control valves.

A typical column 10 for fractionating an inorganic acid-free cleavage reaction mixture from the cleavage reaction of cumene hydroperoxide in the presence of acetone, which column is operated with withdrawal of acetone product for recycle to the cleavage reaction (the withdrawal conduit 80 is present and the flow control valve 82 is open to give the below indicated flow rate), has thirty-four trays in the lower zone 14 and thirty-three trays in the upper zone 16, not counting the partition 12 as a tray. The cleavage reaction mixture feed conduit 28 is located so as to introduce the mixture into the lower zone compartment bottomed by the twentieth tray below the partition 12 (or fifteenth tray from bottom). The acetaldehyde-acetone fraction conduit 42 is disposed so as to introduce the vaporous acetaldehyde-acetone fraction into the upper zone compartment bottomed by the twentieth tray from the upper zone top (or fourteenth tray from the partition 12). The aqueous caustic solution feed conduit 72 is located so as to introduce the 25% by weight aqueous caustic solution into the upper zone compartment bottomed by the eighteenth tray from the upper zone top (sixteenth tray from the partition 12). Reflux liquid is withdrawn by reflux conduit 76 from the upper zone compartment bottomed by the sixteenth tray from the upper zone top (eighteenth tray from the partition 12). Recycle acetone product is withdrawn by way of the recycle acetone product conduit 80 from the upper zone compartment bottomed by the ninth tray from the top of the upper zone 16 (twenty-fifth tray from the partition 12). Temperatures established and maintained in the column 10 are substantially the same as those established and maintained with the column 10 arranged for no withdrawal of liquid acetone product for recycle to the cleavage reaction. Typical normal steady state flow rates in pounds per hour are presented in the following Table II.

TABLE II

| | Conduits or streams | | | | | | | | |
|---|---|---|---|---|---|---|---|---|---|
| | 28 | 33 | 42 | 68 | 72 | 46 | 64 | 80 | 76 |
| Acetaldehyde | 2 | | 2 | | | | 2 | | |
| Acteone | 3,685 | | 10,500 | | | 1,991 | 19 | 1,675 | 6,815 |
| Water | 783 | 40 | 1,050 | 800 | 9 | 1,517 | 2 | 33 | 307 |
| Mesityl oxide | 82 | | 82 | | | 82 | | | |
| Cumene | 1,050 | 142 | 908 | | | 908 | | | |
| α-Methyl styrene | 309 | 53 | 256 | | | 256 | | | |
| Phenol | 3,615 | 3,610 | 5 | | | 5 | | | |
| Acetophenone | 61 | 61 | | | | | | | |
| α-α-Dimethylbenzyl alcohol | 22 | 22 | | | | | | | |
| Cumyl phenol | 186 | 186 | | | | | | | |
| Heavy ends | 205 | 205 | | | | | | | |
| Sodium hydroxide | | | | | | 3 | 3 | | |
| Total | 10,000 | 4,319 | 12,803 | 800 | 12 | 4,762 | 23 | 1,708 | 7,122 |

These flow rates are established and maintained, for example, by means of the various flow control valves.

A feature of advantage of the process of this invention, compared to the prior art process, is the simplified equipment requirements. Where in the prior art process separate multiple plate distillation columns, two overhead condensers, and two reflux drums and associated pumps are required, in the process of this invention only one distillation column, one overhead condenser, one reflux drum (storage tank 56) and associated pump are needed.

Another feature of advantage of the process of this invention is a lower energy requirement. In the prior art process, it is necessary to supply heat to strip the liquid acetaldehyde-acetone fraction of acetaldehyde. In the process of this invention the additional heat needed in the upper zone 16 to maintain the acetaldehyde in the gaseous state and to strip residual acetaldehyde from the condensed acetone is substantially less.

Still another feature of advantage of the process of this invention, which is associated with those embodiments wherein an aqueous solution of alkali metal hydroxide material is introduced into the upper zone, is that the structural parts of the column 10, that define and are included in the upper zone, can be made from carbon steel or the like.

Other features, advantages and specific embodiments of this invention will be readily apparent to those exercising ordinary skill in the art after reading the foregoing disclosures. Such specific embodiments are within the scope of the claimed subject mater unless expressly excluded by claim language. Moreover, while a specific embodiment of this invention has been described in considerable detail, variations and modifications of this embodiment can be effected without departing from the spirit and scope of the invention as disclosed and as claimed.

What I claim and desire to protect by Letters Patent is:

1. A process for fractionating an inorganic acid-free mixture from the cleavage reaction of hydroperoxide material selected from the group consisting of cumene hydroperoxides, cymene hydroperoxides, β - isopropylnaphthalene hydroperoxide, and m- and p-diisopropylbenzene mono- and dihydroperoxides, which comprises:

introducing said mixture into the lower zone of a single, multiple plate distillation column having a lower fractional distillation zone and an upper fractional condensation zone, separating by fractional distillation said mixture in said lower zone into a liquid phenolic fraction and a vaporous acetaldehyde-acetone fraction;

withdrawing liquid phenolic fraction as phenolic product from the bottom of said lower zone;

withdrawing vaporous acetaldehyde-acetone fraction from the top of said lower zone and introducing it into the upper zone at an intermediate feed stage thereof;

separating by fractional condensation said vaporous acetaldehyde-acetone fraction in said upper zone into a vaporous acetaldehyde fraction and a liquid acetone fraction substantially free of acetaldehyde;

withdrawing liquid acetone fraction as acetone product from the bottom of said upper zone;

withdrawing said vaporous acetaldehyde fraction from the top of said upper zone;

introducing an aqueous solution of alkali metal hydroxide material into the upper zone at an intermediate stage selected from said feed stage and wet intermediate stages above said feed stage, the rate of introduction of said aqueous solution being sufficient to establish and maintain alkalinity of the liquid contents of said feed stage and any lower stage of the upper zone as well as the acetone fraction withdrawn from the bottom of the upper zone; and withdrawing liquid from an intermediate stage of the upper zone above the stage at which said aqueous solution is introduced, and introducing it as reflux into said lower zone.

2. A process according to claim 1, wherein vaporous acetaldehyde fraction withdrawn from said upper zone is condensed and at least part of it returned as reflux to said upper zone.

3. A process according to claim 2, wherein said phenolic product is substantially free of acetone.

4. A process according to claim 3, wherein said acetone product is substantially free of acetaldehyde and the phenolic counterpart of said hydroperoxide.

5. A process according to claim 4, wherein said phenolic counterpart is phenol.

6. A process according to claim 5, wherein said aqueous solution of alkali metal hydroxide material is a 1–25% by weight aqueous solution of caustic.

References Cited

UNITED STATES PATENTS

| 3,365,375 | 1/1968 | Nixon, Jr. | 203—82 |
| 3,531,376 | 9/1970 | Minoda et al. | 203—33 |
| 3,215,745 | 11/1965 | Frank | 260—621 C |
| 2,737,480 | 3/1956 | Adams et al. | 203—33 |
| 2,824,049 | 2/1958 | Maincon et al. | 203—97 X |
| 2,957,921 | 10/1960 | Adams et al. | 260—621 C |

FOREIGN PATENTS

| 843,032 | 8/1960 | Great Britain | 260—621 C |

NORMAN YUDKOFF, Primary Examiner

D. EDWARDS, Assistant Examiner

U.S. Cl. X.R.

203—82, 83, 97; 260—593, 601, 621 C

PO-1050
(5/69)

UNITED STATES PATENT OFFICE
CERTIFICATE OF CORRECTION

Patent No. __3,672,961__   Dated __June 27, 1972__

Inventor(s) __J. R. Nixon (Case 6)__

It is certified that error appears in the above-identified patent and that said Letters Patent are hereby corrected as shown below:

Column 1, line 14 corresponding to Pg. 1, line 3 of the Abstract, between " acid- mixture " insert -- free --.

Column 2, line 16 corresponding to Pg. 2, line 29, " proces " should be -- process --.

Column 3, line 20 corresponding to Pg. 4, line 24, " embodnment " should be -- embodiment --.

Column 5, line 39 corresponding to Pg. 8, line 15, omit " to ".

Column 7, line 46 corresponding to Pg. 13, line 11, " mater " should be --matter --.

Signed and sealed this 5th day of December 1972.

(SEAL)
Attest:

EDWARD M. FLETCHER, JR.
Attesting Officer

ROBERT GOTTSCHALK
Commissioner of Patents